(12) United States Patent
Claar

(10) Patent No.: US 7,203,947 B2
(45) Date of Patent: Apr. 10, 2007

(54) NETWORK OBJECT REQUEST BROKER TO AUTOMATICALLY CONNECT CLIENT AND SERVER OBJECTS IN A DISTRIBUTED ENVIRONMENT

(75) Inventor: Jeffrey M. Claar, Aliso Viejo, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 481 days.

(21) Appl. No.: 09/797,077

(22) Filed: Feb. 28, 2001

(65) Prior Publication Data

US 2001/0037411 A1    Nov. 1, 2001

Related U.S. Application Data

(62) Division of application No. 08/937,093, filed on Sep. 24, 1997, now Pat. No. 6,275,870.

(51) Int. Cl.
*G06F 9/44* (2006.01)
*G06F 15/16* (2006.01)
*G06F 13/00* (2006.01)

(52) U.S. Cl. ...................... 719/330; 709/203

(58) Field of Classification Search ................ 709/203, 709/250, 328, 329, 315, 330; 719/315, 329, 719/330, 332
See application file for complete search history.

(56) References Cited

U.S. PATENT DOCUMENTS

| | | | | |
|---|---|---|---|---|
| 5,095,522 A | * | 3/1992 | Fujita et al. ................ | 709/316 |
| 5,450,583 A | * | 9/1995 | Inada ......................... | 709/315 |
| 5,546,584 A | * | 8/1996 | Lundin et al. ............... | 719/315 |
| 5,561,769 A | * | 10/1996 | Kumar et al. ................ | 709/202 |
| 5,724,588 A | | 3/1998 | Hill et al. .................... | 709/303 |
| 5,842,220 A | | 11/1998 | De Groot et al. ............ | 707/103 |
| 5,905,987 A | | 5/1999 | Shutt et al. .................. | 707/103 |
| 6,182,092 B1 | * | 1/2001 | Francis et al. .............. | 715/513 |
| 6,230,159 B1 | * | 5/2001 | Golde ..................... | 707/103 R |
| 6,260,077 B1 | * | 7/2001 | Rangarajan et al. ........ | 709/328 |
| 6,275,869 B1 | * | 8/2001 | Sieffert et al. .............. | 719/321 |
| 6,334,157 B1 | * | 12/2001 | Oppermann et al. ........ | 709/310 |
| 6,405,360 B1 | | 6/2002 | Bohrer et al. ............... | 717/108 |
| 6,412,019 B1 | * | 6/2002 | Gibbons et al. ............ | 719/315 |
| 6,553,428 B1 | * | 4/2003 | Ruehle et al. .............. | 709/330 |

OTHER PUBLICATIONS

Implementation of a transparent RPC for distributed object-oriented systems by Roosmalen et al., 1996 IEEE publications, pp. 54-58.*
Advanced Digital Systems Group, pp. 1-10, 1995.*
SOMobjects Developer Toolkit Users Guide ver 2.0, IBM, Jun. 1993, pp. 6-1-6-27.

* cited by examiner

*Primary Examiner*—Larry D. Donaghue
(74) *Attorney, Agent, or Firm*—Blakely, Sokoloff, Taylor & Zafman LLP

(57) ABSTRACT

A method and system that can efficiently broken objects in a real-time constrained network. The method and system provide two main types of interfaces: client object and server object interfaces. Each client object and server object is instantiated from a class derived from a base class. The class libraries may be written in any object-oriented programming language and compiled on to any platform. Thus, the methodology and system are easily ported to other platforms. Additionally, mirrored client and server objects may be generated which allow an object to behave both as a client and as a server.

16 Claims, 4 Drawing Sheets

C++ Class Hierarchy for Server Side

C++ Class Hierarchy for Client Side

NETWORK OBJECT REQUEST BROKER TO AUTOMATICALLY CONNECT CLIENT AND SERVER OBJECTS IN A DISTRIBUTED ENVIRONMENT

RELATED APPLICATIONS

This is a divisional of U.S. patent application Ser. No. 08/937,093, now U.S. Pat. No. 6,275,870, filed on Sep. 24, 1997.

COMPUTER PROGRAM LISTING APPENDIX

A computer program listing appendix (50L1868 01 code.cc), submitted on duplicate compact discs, includes Appendix A as referred to herein. The computer program listing appendix is hereby incorporated by reference.

BACKGROUND OF THE INVENTION

1. Field of the Invention

The invention relates generally to the field of computer software. More specifically, the invention relates to object-oriented programming structures.

2. Background

When two or more information devices such as computing machines or audio/video (A/V) equipment are connected together in a network environment, the method and means of communication amongst them should be robust and tailored to fit the application being performed. One such method and means known as COM (Component Object Model) developed by Microsoft Corporation, provides for a highly developed system of "objects" transacted among software components executing within a single device such as a personal computer. Since COM does not adequately support the passing of such objects among components executing on separate devices, an extension of COM known as DCOM (Distributed Component Object Model) was also developed. One operating system platform that adopts and transacts objects according to DCOM is the Windows NT™ operating system (a trademark of Microsoft Corporation).

While useful for many computing applications deriving from or desiring the use of a network, DCOM is inadequate for certain other applications. One class of applications for which DCOM is inadequate and prohibitive, are real-time applications. Real-time applications suffer greatly under the effect of high latency due to the tremendous overhead involved in DCOM. For instance, DCOM, at every instantiation or a new object requires that a class factory first be instantiated and that then the object be manufactured.

Further, under DCOM, the creation of every object involves a search through the windows operating system "registry" which tracks objects for all the various applications and services running under the operating system. While DCOM is highly extensible making for easy creation or new objects dynamically, by linking, for example, to a Dynamic Linked Library, this introduces more overhead and latency. In a real-time system where the system components and their objects are fairly well-known and defined, there is no motivation for such extensibility.

A further problem with DCOM technology and other such operating system specific object-oriented technology is one of non-portability. A non-Windows NT™ or Windows 95 computer system cannot run applications that utilize DCOM. Thus, applications written with object-oriented methods of DCOM cannot be ported to other platforms without great difficulty.

What is needed is a simpler, more efficient and lower latency distributed object technology that enables multiple devices on a network to interact. Further, it would be desirable for such a technology to be easily ported from one platform to the next, such that utilizing applications can also be readily ported.

SUMMARY OF THE INVENTION

What is disclosed is a method for efficiently connecting client objects and server objects in a distributed environment. The method includes he initiating a server object interface and a client object interface. The creation of the client object interface forms an automatic connection between client object and server object. For those objects desired act as both client and server, mirrored interfaces are also initiated.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
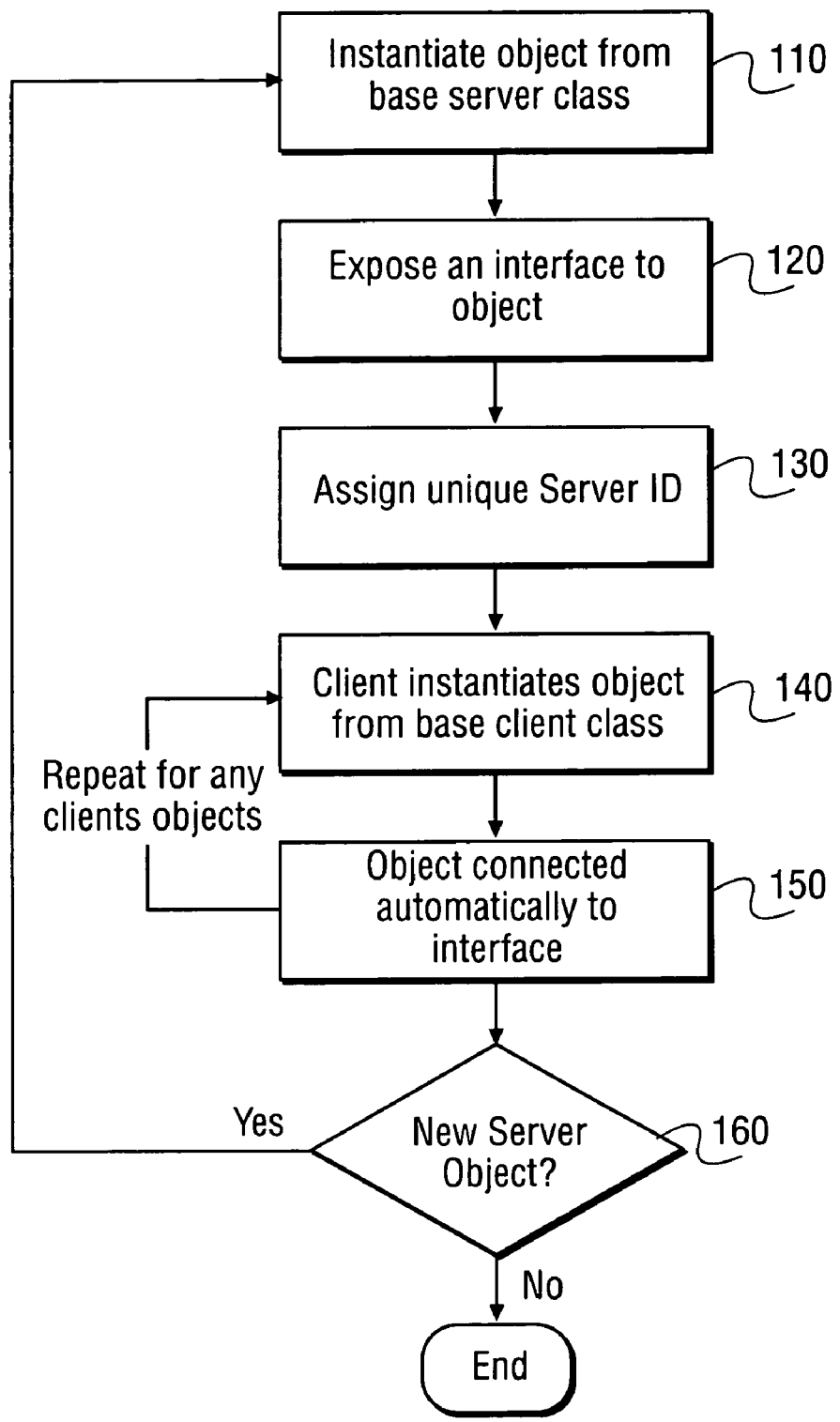
FIG. 1 is a flow diagram illustrating the connecting of network objects.

FIG. 1 is a flow diagram illustrating the connecting of network objects.

Objects which originate from external nodes of a network or reside at a local node may at times behave like a "server". A server object may be a data set, function call or state maintainer that provides or offers services when requested. The requester may also be itself an object and when requesting acts as a "client" object. FIG. 1 illustrates a methodology for connecting together the client object and server object which is efficient and permits real-time system operation.

First, to create a server object, an object is instantiated from a class derived from a base server class (referred to as SyIfServerBase) (step 110). This base server class allows multiple server objects to be created and is included in the run-time environment of ail network nodes. Next, to make the newly instantiated server object visible to other network objects, an interface to the newly instantiated server object is exposed to the system/network (step 120). To expose an interface, several function calls are initiated. Appendix A shows two such calls ProvideInterface and ExportInterface. These function calls make other lower-level operating system calls which expose the interface for object to connect to them.

Next, when the interface to server object is exposed, it passes along to any clients a unique server ID (referred to as RPCServerID). This ID is unique because for each server object that is created, the RPC Server ID is incremented by 1. Thus, for each subsequent object, its ID will be unique with respect to other ID's in the system process. Having a unique RPCServerID guarantees that server object will be exclusively identified when communicating with client objects.

Once the ID of a server object has been established and exposed along with the interface, then the client connection can be initiated. In order for the object to attain the status of a client, it is instantiated from a class that has been derived from a base client class (referred to as SyIFaceBase in Appendix A) (step 140). This base client class allows any number of clients to descend with characteristics consistent with that of a "client" object. The creation of client object "automatically" connects the client object with the server interface (step 150). Before any client objects can be created, a server object must have its interface exposed to the network/system. During creation of a client object, the RPCServerID is passed to it through an interface other than the interface to the server object. An RPCServerID is only required for those server objects having more than one instance (examples are described below). Thus, client objects can connect to server object interfaces without the RPCServerID in those cases here the RPCServerID is not needed to identify the server object interface.

For any given server object, especially in a distributed environment, it would be desirable to allow multiple client objects to connect to one server object. This is enabled by repeating steps 140–150 for each such client object. New server objects may be instantiated at any time regardless of whether all corresponding client objects have been created or not.

If there are any server objects that need to be created (checked at step 160), a new server object is instantiated from a class that is derived from the same base server class which instantiated the previous server object(s) (step 110). Thus, steps 110–150 repeat for every new server object. Objects can be disconnected by reversing the above methodology. Interfaces can be removed and garbage collection performed to disconnect objects. Further, objects may be disposed of if they are not being utilized by the system.

The methodology of FIG. 1 is efficient by connecting client objects automatically to their respective server object. In a real-time system, this reduction latency offered by such a mechanism is valuable. By contrast, as mentioned in the background, DCOM introduces many extra features not needed in a well-defined real-time system, and thus adds excess overhead, such as the creation of class factories or the querying of a registry to obtain information regarding objects.

Figure 2A:
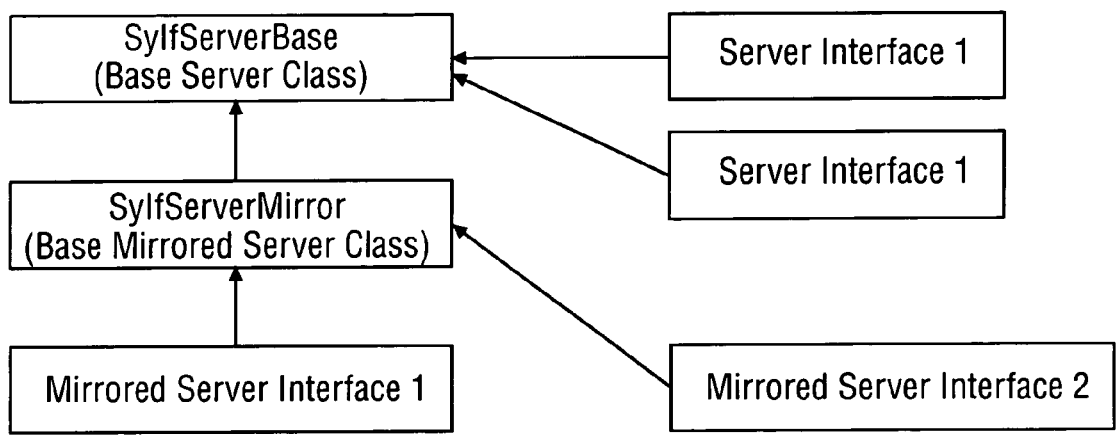
FIG. 2(a) illustrates the nheritance hierarchy for servers and server objects.
Figure 2B:
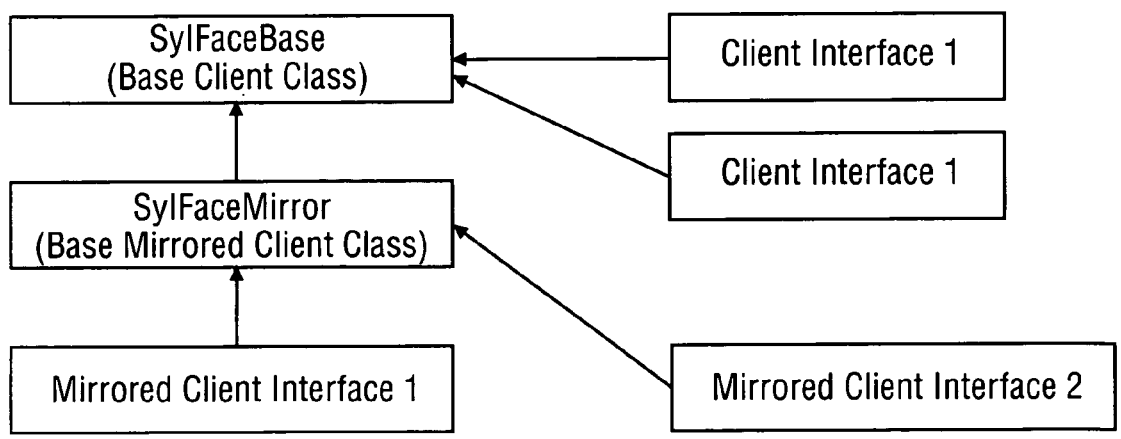
FIG. 2(b) illustrates the inheritance hierarchy for clients and client objects.

FIG. 2(*a*) illustrates the inheritance hierarchy for servers and server objects.

The class inheritance hierarchy for server objects has as a root, the base server class SyIfServerBase (see Appendix A). Server Interface 1, an interface for a first server object, descends from base server class SyIfServerBase. Likewise the Server Interface 2, an interface for a second server object descends from the same base server class SyIfServerBase. Thus, the construction of a single base class allows for efficient and rapid creation of new server object interfaces.

FIG. 2(*a*) introduces another type of interface, the Mirrored Server Interface. When an object wishes to act as both a client and server (i.e., both requesting and providing data, calls, etc.), then a Mirrored Interface is created. Since the server class requires communication both to and from the client, it is appropriate to derive or descend the base mirror class (SyIfServerMirror) from the base server class SyIfServerBase. For objects that desire to behave both as clients and as servers, interfaces such as Mirrored Server Interface 1 and Mirrored Server Interface 2 are created and exposed to the network or object environment. FIG. 2(*a*) shows a Mirrored Server Interface 1 and Mirrored Server Interface 2 that are descended from the base Mirrored Server class. Objects attached to the Mirror Server Interface act as server objects, but as illustrated in FIG. 2(*b*) may also take on the characteristic of a client object. The Mirrored Server Interface establishes a two-way one-to-one connection between a server object acting as a client and a client object acting as a server. The mirrored server exposes an interface which the client, and only that one client, connect to. The client object also exposes an interface for the server object to connect to.

FIG. 2(*b*) illustrates the inheritance hierarchy for clients and client objects.

The class inheritance hierarchy for client objects has as a root, the base client class SyIFaceBase (see Appendix A). Client Interface 1, an interface for a first client object, descends from base client class SyIFaceBase. Likewise the Client Interface 2, an interface for a second client object descends from the same base client class SyIFaceBase. Thus, the construction of a single base class allows for efficient and rapid creation of new client object interfaces.

FIG. 2(*b*) introduces another type of interface, the Mirrored Client Interface. When an object wishes to act as both a client and server (i.e., both requesting and providing data, calls, etc.), then a pair of Mirrored Interfaces are created. FIG. 2(*a*) above showed the creation of a mirrored server interface. Since the client class requires communication both to and from the server, it is appropriate to derive or descend the base mirror class (SyIFaceMirror) from the base client class SyIFaceBase. For objects that desire to behave both as clients and as servers, interfaces such as Mirrored Client Interface 1 and Mirrored Client Interface 2 are created and exposed to the network or object environment. FIG. 2(*b*) shows a Mirrored Client Interface 1 and Mirrored Client Interface 2 that are descended from the base Mirrored Client class. The Mirrored Client Interface establishes a two-way one-to-one connection between a client object acting as a server and server object acting as a client. The mirrored client exposes an interface which a mirrored server, through its Mirrored Server Interface, can connect to.

One advantage not readily apparent in the illustrations of FIGS. 2(*a*)–2(*b*) is ease of implementation and portability as compared with DCOM. The code shown in Appendix A can be generalized for any operating environment and the hierarchy in FIGS. 2(*a*)–2(*b*) may be implemented in C++. This differs from DCOM, which specifies its own object terminology and could only be implemented in a Windows environment or other operating system that Microsoft chooses to support. The invention, in its various embodiments, can, by contrast, be implemented in any object oriented programming language such as C++ or Java, and thus enjoys great portability. By changing merely the terminology of certain operating system specific calls, the C++ code or class modules can be recompiled when it is desired to port the invention to other platforms such as UNIX or any real-time operating system that is required. The class hierarchy of FIGS. 2(*a*)–2(*b*) may be thus identically employed in any platform. Though the code shown in Appendix A in NT-call specific, one of ordinary skill can readily implement the various embodiments of the invention by modifying the NT specifics to other platform specific calls.

Figure 3:
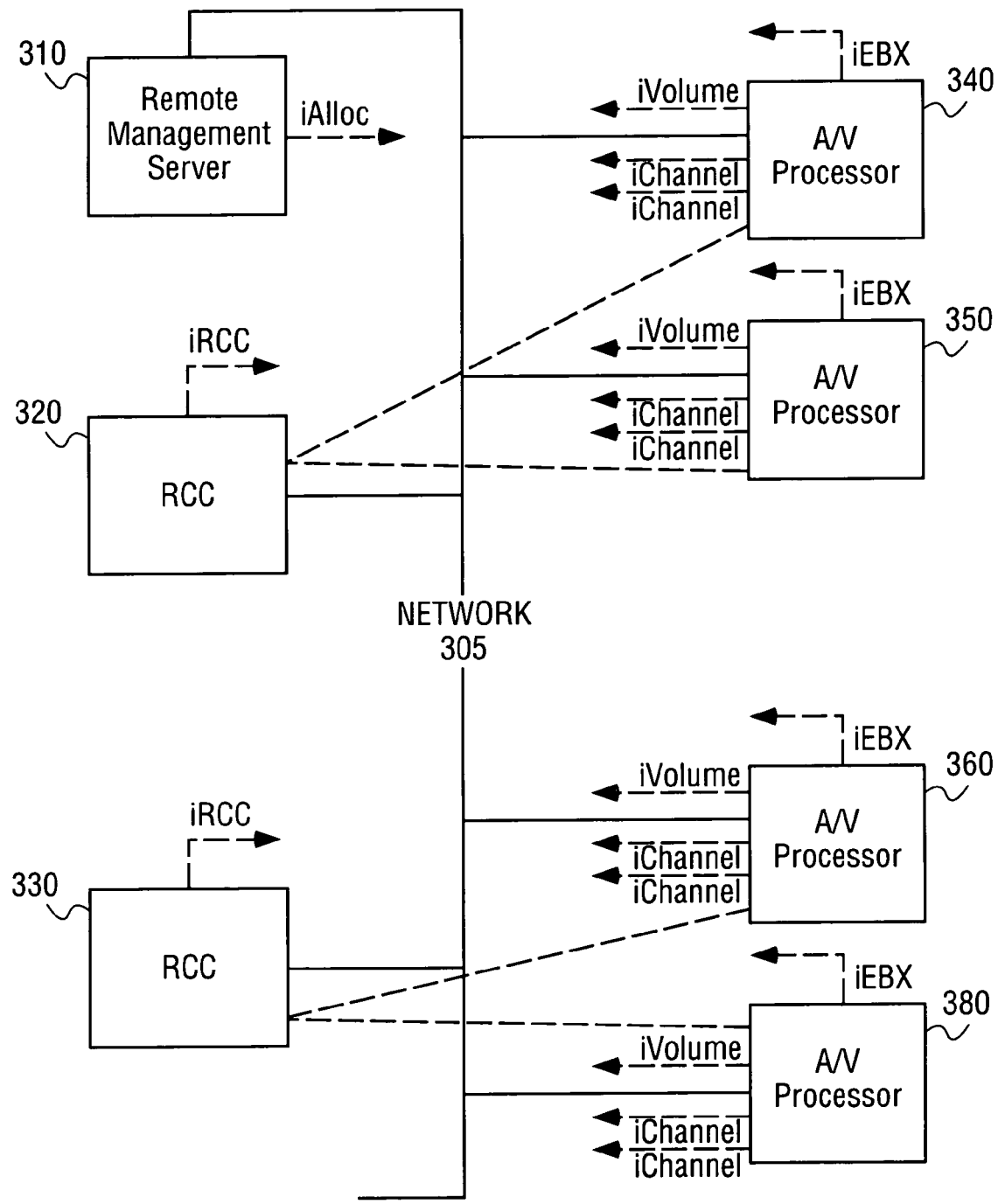
FIG. 3 illustrates an exemplary real-time system employing the various embodiments of the invention.

FIG. 3 illustrates an exemplary real-time system employing the various embodiments of the invention.

The components of the FIG. 3 system are distributed over a network 305 which is a form of communications interface that links together remotely located devices by wire and/or propagated wave. The real-time system of FIG. 3 has a plurality of audio/video (A/V) processors 340, 350, 360 and 380 which are controlled Remote Control Centers (RCCs) 320 and 330. RCC 320 controls A/V processor 340 and A/V processor 350 while RCC 330 controls A/V processor 360 and A/V processor 380. RMS 310 serves to maintain state information and timing information for synchronizing the network devices and serves to monitor RCC 320 and RCC 330.

Using the object-oriented approach shown in the various embodiments of the invention, the real-time system of FIG. 3 can operate as follows. When any of the networked devices has powered up, that device can begin to execute, independent of other devices, the class methodology shown in FIG. 2. Thus, each device, in this exemplary embodiment, has its own executable code which when including the class definitions of the inventions will be capable of brokering its own objects to other devices.

Upon system start-up, each A/V processor and each RCC looks for the RMS 310 to have started or initialized. When RMS 310 has started, each A/V processor and/or RCC will register itself. This is achieved by the RMS exposing an interface (see iAlloc of Appendix A) as a server object. This interface descends from the base server class. Once the RMS has initialized, each device will register itself by calling the interface to RMS 310. The interface to RMS 310 will provide a binding handle to each of the client (or objects), the RCCs and A/V processors.

Next, each RCC 320 and 330 will call the RMS interface again to inform the RMS which A/V processor(s) it controls and has responsibility for managing. By repeatedly utilizing the single RMS server interface, the RMS can be made aware of the topology and scheduling of all components on the network. The RCCs and A/V processors are "client" objects in relation to the RMS since they connect to the RMS as clients to the iAlloc interface with a binding handle since iAlloc is only instantiated once in the system. In one regard, the binding handle can be viewed as a client ID which identifies which client is connecting with the server.

Though each RCC controls its respective A/V processors, each A/V processor is capable of self-control/manipulation as well. For instance, if A/V processor 380 were outfit with a control panel that a user could manipulate to change certain settings, then, unless a "mirrored" interface were provided, RCC 330 which is responsible for A/V processor 380 would be unaware of the setting changes. Further, the RMS 310 would be unaware of the change in settings and thus, could not issue control information, if needed, to other A/V processors.

Each A/V processor of the real-time system in FIG. 3 is capable of independent data processing. In this example, no audio/video data which is processed on an A/V processor originates from other A/V processors on the network (see FIG. 4), and thus, network 305 is not responsible for passing audio/video data across the network. Though A/V processors 340, 350, 360 and 380 process locally originating data, the processing involves synchronization of the separate streams to begin and end at a particular time index. For instance, each A/V processor may be responsible for processing a certain number of audio streams (channels) that are to later to be combined or mixed. In this case, the A/V processor must synchronize their operation to at least correctly insert timing information.

In the embodiment shown, for example, each A/V processor will have the following interfaces: iEBX (information for the entire A/V processor such as IDs, etc.), iVolume (information identifying the mass storage device used by the A/V processor), and iChannel (information regarding the audio stream). If A/V processor 340 is processing four channels of audio data, for example, then iChannel would be instantiated four times. Since iChannel is indicative of changes that can be initiated by both an RCC and by the A/V processor itself, it is desirable to provide a mirrored server interface for each iChannel.

Each A/V processor has an iEBX, which since it is a client only to the corresponding RMS, It will be identified by a binding handle rather than a unique ID. With each "process" or "machine" such as an A/V processor, any other objects with more than one instance, such as iChannel and iVolume will have RPCServerIDs identifying them. For instance, a client object connects to an A/V processor first through iEBX using a binding handle. Thereafter, the client object can communicate with an iVolume (using a RPCServerID if more than one iVolume is on the device, such as shown on A/V processor 380) to get the RPCServerIDs for the iChannel interfaces. Then the client object will be able to access and identify correctly the audio channel about which information is being passed.

The mirrored server interface (see FIG. 2) for iChannel will allow information about each channel, such as whether the channel has been muted, to be passed in two-way communication with a mirrored client. This two-way mirrored interface would allow a channel to be muted via a control local to the A/V processor while also informing the interested network components such as the controlling RCC and RMS, that the channel has been muted. The object implementing the muting of that channel is the mirrored server, and a mirrored client would be notified of the change in state when it occurs by using the mirrored client interface.

Since no audio/video data is being transferred over the network, any latency is due only to the passing of control/state/administrative information between components. The object-interface model provided for by the various embodiments of the invention reduces the latency from the prior art DCOM/COM model because of the reduced overhead/latency in instantiating and connecting objects over the network. In the system of FIG. 3, objects created using the COM or DCOM technology would disrupt the real-time performance of the system which needs objects such as state information whether a channel has been muted or is recording to be passed quickly is too prohibitive.

For instance, if a change in state, such as the recording of a channel is occurring on one A/V processors without consent of the RCC, then, to inform the RCC of the change in state, the RCC would need to become a client. If a mirrored client interface on the RCC and a Mirrored Server Interface for iChannel is already present, then state change will pass quickly from interface to interface and thus from object to object. The establishing of an interface allows objects to quickly share information. By contrast, DCOM introduces more parameters and and other external interfacing making the function calls to support objects have more overhead. This introduces latency and while, DCOM is more dynamic, such robustness is not needed in a close-ended system such as that shown in FIG. 3.

Thus, depending upon the application involved, the interfaces will need to pass only information that objects request or need and since the system for which the class code is written does not vary dramatically from run-time to run-time, unlike DCOM, which deals with more arbitrary conditions, the interfacing operation is more streamlined. One of ordinary skill in the art will be able readily to tailor the server-client-mirrored interface class of the various embodiments of the invention to that of the particular system apparatus and method on application by slightly modifying the code shown in Appendix A. Additionally, though FIG. 3 refers to physical components of a network, the concept is extendible to processes which may operate similar to the described components.

Figure 4:
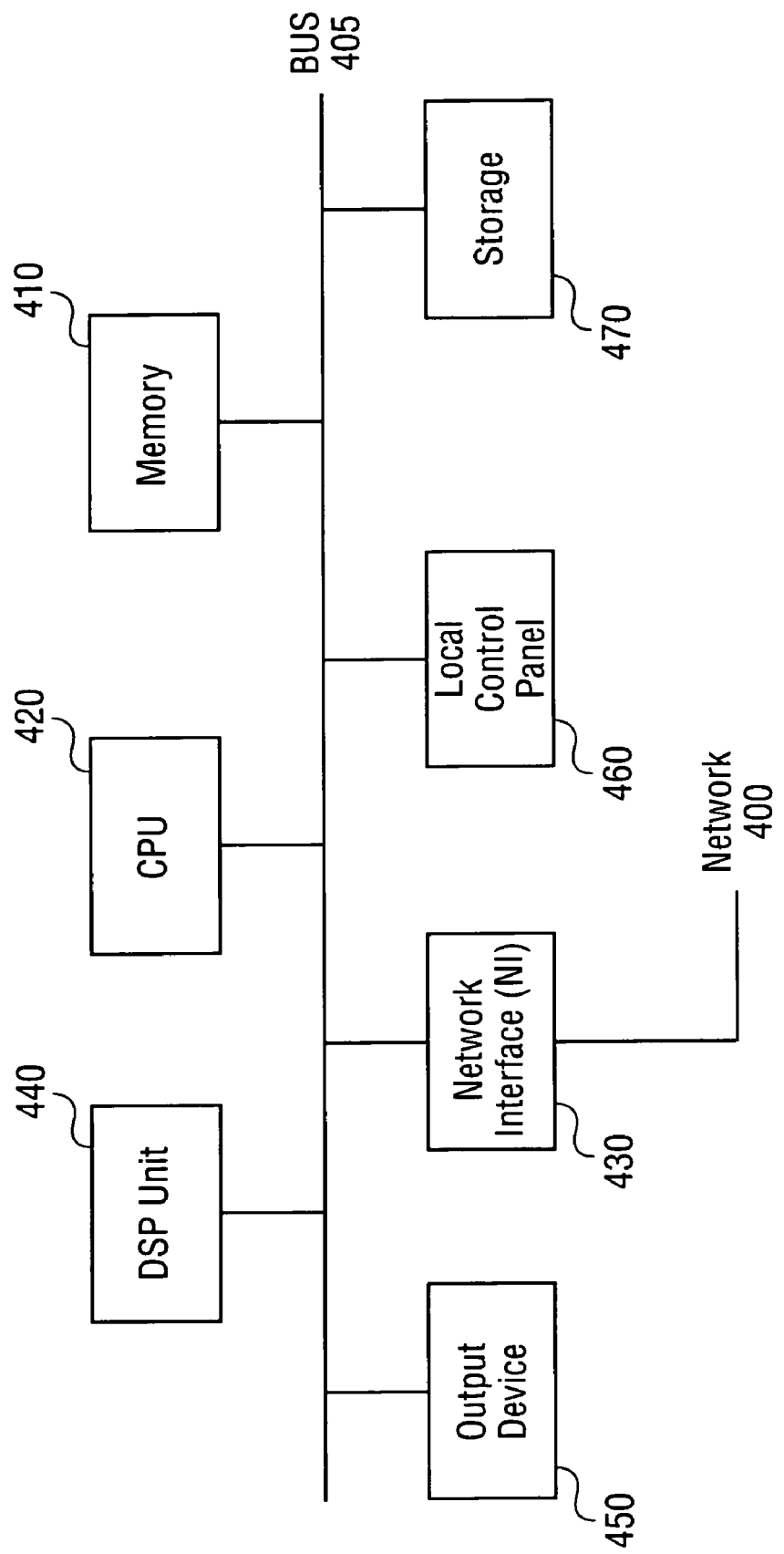
FIG. 4 illustrates a computer system capable of implementing the various embodiments of the invention.

FIG. 4 illustrates a computer system capable of implementing the various embodiments of the invention.

Each of the A/V processors shown in FIG. 3 can be implemented as a computer system shown in FIG. 4. The computer system of FIG. 4 includes a CPU (Central Processing Unit) 420, memory 410, DSP (Digital Signal Processing) unit 440, output device 450 and a network interface (NI) 430.

A bus 405, such as PCI (Peripheral Component Interconnect), couples together CPU 420, memory 410, DSP unit 440, output device 450 and NI 430 such that they may transact data and control information among one another. The C++ class libraries mentioned in the various embodiments of the invention which includes the base server class, base client class, base mirrored client class and base mirrored server class can be compiled as a set of instructions stored in memory 410 and executed by CPU 420. Other instructions, such as the command to record audio data onto a storage unit 470, may also be loaded into memory 410 for execution by CPU 420. These class libraries may be stored on storage unit 70 prior to being compiled and executed. When audio/video data is played/recorded, the channels of data are processed by DSP unit 440 which may be a single interface card or a combination of hardware (Integrated Circuit) and software. The processed data is then rendered or "played" on output device 450 such as speaker or display.

Commands to play, record, mute a channel and so on may originate from a network 400 with whom communication is made possible by NI 430. According to one embodiment of the invention, the client object interface and mirrored interfaces can connect to a server object interface (such as iRCC, see FIG. 3) which is exposed on network 400. If a local control panel 460 were used to change the processing by, for example, the muting of a channel, then a Mirrored Server Interface would be utilized to notify other objects (which then act as clients requesting information) on network 400 that the channel has been muted. If the iChannel interface for that channel is already created, then a mirrored server interface, whether already existing or newly created, will allow such notification to take place. These interfaces may be created during run-time when CPU 420 is executing the code which operates the system.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

APPENDIX A

```
// NAME servbase.hpp
//
// DESCRIPTION
//     Definitions for SyIfServerBase and SyIfServerMirror.  All server interface class wrappers
//     should derive from one of these two classes.  If the interface is not mirrored, derive
//     from SyIfServerBase.  Otherwise, derive from SyIfServerMirror.
//
// COPYRIGHT
//     Copyright 1995 by Advanced Digital Systems Group, All rights reserved.
//
// VERSION CONTROL
//     $Header:   G:/PVCS/ARCHIVES/INCLUDE/servbase.hpv   1.14   Apr 09 1997 11:31:04   jclaar  $
#ifndef __SERVBASE_HPP__
define __SERVBASE_HPP__ include <alttypes.h>
include <cmpmain.h>
include <servbase.h> if _MSC_VER < 1020
include <new.h>
#include <iostream.h>
// Make sure oaidl.h is included to avoid conflicts with STL and the
// VARIANT_BOOL type.
#ifndef __oaidl_h__
#include <oaidl.h>
#endif
_SY_STD_BEGIN
#include <map.h>
_SY_STD_END
#else
#include <map>
endif pragma warning(disable: 4786)

// Forward references
class SyIfServerBase;
class SyIfServerMirror;
class SyString;

#if _MSC_VER < 1020
typedef STD::map<RpcServerID, SyIfServerBase*, STD::less<RpcServerID> > ServerIDMap;
typedef STD::map<RPC_IF_HANDLE, int, STD::less<RPC_IF_HANDLE> > ServerHandleMap;
#else
typedef STD::map<RpcServerID, SyIfServerBase*, STD::less<RpcServerID>,
                        STD::allocator<SyIfServerBase*> > ServerIDMap;
typedef STD::map<RPC_IF_HANDLE, int, STD::less<RPC_IF_HANDLE>,
                        STD::allocator<int> > ServerHandleMap;
endif class SyIfServerBase
{
    private:
        RPC_IF_HANDLE mIfSpec;
        UUID* mObjUuid;
        RpcServerID mServerID;
        static RpcServerID sCurrentID;

static ServerIDMap sObjMap;
        static ServerHandleMap sHandleMap;

public:
        CMPDLL_EXPORT SyIfServerBase(RPC_IF_HANDLE ifHandle,
            UUID* objUuid = NULL,
            UUID* MgrTypeUuid = NULL, RPC_MGR_EPV* MgrEpv = NULL);
        //
        // Input
        //     ifHandle - interface handle (server version)
        //     MgrTypeUuid - UUID for interface re-implementation
        //     MgrEpv - Function table for interface re-implementation
        // Description
        //     Constructs a server class.

CMPDLL_EXPORT virtual ~SyIfServerBase();

CMPDLL_EXPORT static SyIfServerBase* GetThis(RpcServerID serverID);
        //
        // Input
```

```
//    uuid - UUID of object.
// Return
//    Pointer to SyIfServerBase object
// Error
//    If uuid does not map to an object, the function returns NULL.
// Description
//    Returns a pointer to a class instance based on the uuid.  This uuid should be
//    equal to mObjUuid.

RpcServerID GetServerID() const { return mServerID; }
};

// Helper macros to iterate through mirror functions
#define MIRROR_ITERATE_BEGIN \
    { \
    ServerMirrorMap map = this->GetMirrorList(); \
    for (ServerMirrorMap::iterator iter = map.begin(); iter != map.end(); iter++) \
    { \
        RPC_BINDING_HANDLE hdl = (*iter).second; \
        RpcServerID id = (*iter).first; \
        RpcTryExcept { define MIRROR_ITERATE_END \
        } \
        RpcExcept(1) { \
            TCHAR sMsg[32]; \
            wsprintf(sMsg, _T("Mirroring exception %d\n"), ::RpcExceptionCode()); \
            OutputDebugString(sMsg); \
        } \
        RpcEndExcept; \
    } } class SyIfServerMirror : public SyIfServerBase
{
    private:
        // Disable default constructor
        SyIfServerMirror();

#if _MSC_VER < 1020
        typedef STD::map<RpcServerID, RPC_BINDING_HANDLE, STD::less<RpcServerID> > ServerMirrorMap;
#else
        typedef STD::map<RpcServerID, RPC_BINDING_HANDLE, STD::less<RpcServerID>,
                        STD::allocator<RPC_BINDING_HANDLE> > ServerMirrorMap;
#endif
        ServerMirrorMap* mMirrorList;
        RPC_BINDING_HANDLE mIfMirror;

// Reference counter to provide interface
        static int sRefCount;

private:
        BOOL AddMirror(RpcServerID objID, RPC_BINDING_HANDLE hdl);
        RPC_BINDING_HANDLE RemoveMirror(RpcServerID objID);

protected:
        virtual void GetMirrorIFInfo(RPC_IF_HANDLE& ifSpec) = 0;
        CMPDLL_EXPORT RPC_BINDING_HANDLE GetBindingHdl(RpcServerID objID) const;

public:
        CMPDLL_EXPORT SyIfServerMirror(RPC_IF_HANDLE ifMirror,
            RPC_IF_HANDLE ifHandle, UUID* objUuid = NULL,
            UUID* MgrTypeUuid = NULL, RPC_MGR_EPV* MgrEpv = NULL);
        //
        // Input
        //    ifMirror - Interface handle for mirror interface (server version)
        //    ifHandle - Interface handle for server interface (server version)
        //    bUseUuid - TRUE to use object UUID, FALSE to ignore it
        //    MgrTypeUuid - UUID for interface re-implementation
        //    MgrEpv - Function table for interface re-implementation
        // Error
        //    Various RPC error can occur.
        // Description
        //    Constructor for a mirrored interface. Interfaces that provide response interfaces
        //    should derive from this class.

CMPDLL_EXPORT virtual ~SyIfServerMirror();

RPC_STATUS AddResponseIF(RpcServerID objID, const SyString& pszServerName);
```

A-2

```
//
// Input
//     objID - Object ID of response interface
//     pszServerName - Name of server that provides response interface
// Return
//     RPC_S_OK or RPC_S_ error code
// Error
//     Various RPC errors can occur.  Be sure to check the return value.
// Description
//     Connects the object with a response interface.

BOOL RemoveResponseIF(RpcServerID objID);
//
// Input
//     objID - Object ID of response interface
// Return
//     BOOL - non-zero if successful, zero otherwise
// Error
//     RPC errors can occur.  Be sure to check the return value.
// Description
//     Removes a response interface previously provided by AddResponseIF.

// The following functions are the equivalents of AddResponseIF and RemoveResponseIF,
// but are static so that they may be called by RPC functions.
CMPDLL_EXPORT static RPC_STATUS RpcAddResponseIF(RpcServerID serverID, RpcServerID objID,
    const SyString& pszServerName);
CMPDLL_EXPORT static void RpcRemoveResponseIF(RpcServerID serverID, RpcServerID objID);
};

#endif
```

```
// NAME servbase.cpp
//
// DESCRIPTION
//     Definitions for SyIfServerBase and SyIfServerMirror.  See servbase.hpp.
//
// COPYRIGHT
//     Copyright 1995 by Advanced Digital Systems Group, All rights reserved.
//
// VERSION CONTROL
//     $Header:   G:/PVCS/ARCHIVES/cmp/servbase.cpv   1.19   Apr 09 1997 11:30:20   jclaar  $
#include "precomp.h"

#include <servbase.hpp>
#include <regiface.hpp>
#include <ifacekey.h>
#include <imirror.h>
#include <dbgflags.hpp>
#include <strngcls.hpp>
#include <dbgdump.h>

ServerIDMap SyIfServerBase::sObjMap;
ServerHandleMap SyIfServerBase::sHandleMap;

RpcServerID SyIfServerBase::sCurrentID = 1;

SyIfServerBase::SyIfServerBase(RPC_IF_HANDLE ifHandle, UUID* objUuid,
 UUID* MgrTypeUuid, RPC_MGR_EPV* MgrEpv)
{
    // MgrTypeUuid & MgrEpv must be both non-NULL or both NULL
    _ASSERT( ((MgrTypeUuid == NULL) && (MgrEpv == NULL)) || ((MgrTypeUuid != NULL) && (MgrEpv != NULL
)) );
    mIfSpec = ifHandle;
    if (objUuid != NULL)
    {
        mObjUuid = new UUID;
        *mObjUuid = *objUuid;
    }
    else
        mObjUuid = NULL;

mServerID = sCurrentID++;

// If this is the first addition for this IF_HANDLE, provide the interface.
    RPC_MGR_EPV* pEpv;
    int nRefCount = 0;
    if (::RpcServerInqIf(mIfSpec, MgrTypeUuid, &pEpv) != RPC_S_OK)
    {
        if (::ProvideInterface(mIfSpec, MgrTypeUuid, MgrEpv) == RPC_S_OK)
        {
            if (::ExportInterface(ifHandle, objUuid) == RPC_S_OK)
            {
                nRefCount = 1;
            }
        }
    }
    else
    {
        ServerHandleMap::iterator i = sHandleMap.find(mIfSpec);
        _ASSERT(i != sHandleMap.end());
        nRefCount = (*i).second + 1;
        sHandleMap.erase(i);
    }
    if (nRefCount > 0)
        sHandleMap[mIfSpec] = nRefCount;

sObjMap[mServerID] = this;
}

SyIfServerBase::~SyIfServerBase()
{
    int nRefCount;
    ServerHandleMap::iterator i = sHandleMap.find(mIfSpec);
    if (i != sHandleMap.end())
    {
        nRefCount = (*i).second - 1;
        sHandleMap.erase(i);
        if (nRefCount == 0)
        {
            ::UnexportInterface(mIfSpec, mObjUuid);
```

```
        ::RemoveInterface(mIfSpec);
    }
    else
        sHandleMap[mIfSpec] = nRefCount;
}

ServerIDMap::iterator iter = sObjMap.find(mServerID);
if (iter != sObjMap.end())
    sObjMap.erase(iter);

delete mObjUuid;
}

SyIfServerBase* SyIfServerBase::GetThis(RpcServerID serverID)
{
    ServerIDMap::iterator i = sObjMap.find(serverID);
    return (i == sObjMap.end()) ? NULL : (*i).second;
} int SyIfServerMirror::sRefCount = 0;

SyIfServerMirror::SyIfServerMirror(RPC_IF_HANDLE ifMirror,
 RPC_IF_HANDLE ifHandle, UUID* objUuid,
 UUID* MgrTypeUuid, RPC_MGR_EPV* MgrEpv) :
 SyIfServerBase(ifHandle, objUuid, MgrTypeUuid, MgrEpv)
{
    {
#ifdef _DEBUG
        SyDebugFlags trackingOff;
#endif
        // Provide the mirroring interface
        mMirrorList = new ServerMirrorMap;
    } mIfMirror = ifMirror;
    RPC_STATUS status = RPC_S_OK;
    if (sRefCount++ == 0)
    {
        if (::ProvideInterface(mIfMirror) == RPC_S_OK)
        {
            ::ExportInterface(mIfMirror);
        }
    }
}

SyIfServerMirror::~SyIfServerMirror()
{
    if (--sRefCount == 0)
    {
        ::UnexportInterface(mIfMirror);
        ::RemoveInterface(mIfMirror);
    } if (!mMirrorList->empty())
    {
        mMirrorList->clear();
        SYTRACE(_T("WARNING: SyIfServerMirror object destroyed ")
            _T("with mirror interfaces still attached.\n"));
    }
    delete mMirrorList;
}

RPC_STATUS SyIfServerMirror::RpcAddResponseIF(RpcServerID serverID, RpcServerID objID, const SyStrin
g& pszServerName)
{
    SyIfServerMirror* th = (SyIfServerMirror *) SyIfServerBase::GetThis(serverID);
    if (th != NULL)
        return th->AddResponseIF(objID, pszServerName);
    return RPC_S_OBJECT_NOT_FOUND;
} void SyIfServerMirror::RpcRemoveResponseIF(RpcServerID serverID, RpcServerID objID)
{
    SyIfServerMirror* th = (SyIfServerMirror *) SyIfServerBase::GetThis(serverID);
    if (th != NULL)
        th->RemoveResponseIF(objID);
}

BOOL SyIfServerMirror::AddMirror(RpcServerID objID, RPC_BINDING_HANDLE hdl)
```

```
{
    BOOL bRetVal = FALSE;
    ServerMirrorMap::iterator i = mMirrorList->find(objID);
    if (i == mMirrorList->end())
    {
        (*mMirrorList)[objID] = hdl;
        bRetVal = TRUE;
        SYTRACE(_T("Added mirror: %d, %x\n"), objID, hdl);
    }
    return bRetVal;
}

RPC_BINDING_HANDLE SyIfServerMirror::RemoveMirror(RpcServerID objID)
{
    RPC_BINDING_HANDLE hdl;
    ServerMirrorMap::iterator i = mMirrorList->find(objID);
    if (i != mMirrorList->end())
    {
        hdl = (*i).second;
        mMirrorList->erase(i);
    }
    else
        hdl = NULL;
    return hdl;
}

RPC_STATUS SyIfServerMirror::AddResponseIF(RpcServerID objID,
 const SyString& pszServerName)
{
    SyRpcClient rpcClient(FALSE);
    RPC_IF_HANDLE ifSpec;
    this->GetMirrorIFInfo(ifSpec);
    RPC_STATUS status = rpcClient.ConnectToInterface(ifSpec, pszServerName, NULL);
    if (status == RPC_S_OK)
    {
        this->AddMirror(objID, rpcClient);
    }
    return status;
}

BOOL SyIfServerMirror::RemoveResponseIF(RpcServerID objID)
{
    RPC_BINDING_HANDLE hdl = this->RemoveMirror(objID);
    BOOL bRetVal = FALSE;
    if (hdl != NULL)
    {
        SyRpcClient rpcClient;
        rpcClient.Attach(hdl);
        bRetVal = TRUE;
    }
    return bRetVal;
}

RPC_BINDING_HANDLE SyIfServerMirror::GetBindingHdl(RpcServerID objID) const
{
    ServerMirrorMap::const_iterator i = mMirrorList->find(objID);
    return (i == mMirrorList->end()) ? NULL : (*i).second;
}
```

```
// NAME ifbase.hpp
//
// DESCRIPTION
//     Definition for SyIFaceBase and SyIFaceMirror.  All client RPC interface wrappers should derive
//     from one of these two classes.
//
//     If the interface is not mirrored, derive from SyIFaceBase.  If the interface is mirrored,
//     derive from SyIFaceMirror.
//
// COPYRIGHT
//     Copyright 1995 by Advanced Digital Systems Group, All rights reserved.
//
// VERSION CONTROL
//     $Header:   G:/PVCS/ARCHIVES/INCLUDE/ifbase.hpv   1.15   Feb 28 1997 16:41:48   jclaar  $
#ifndef __IFBASE_HPP__
define __IFBASE_HPP__ include <cmpmain.h>
include <regiface.hpp>
#include <servbase.hpp>
#include <rpcexc.hpp>

// Support macros for descendents of the SyIFaceBase class.  These macros essentially wrap the RPC
// exception handling into two macros.
#define IFACE_RPC_START    RPC_BINDING_HANDLE hdl = this->GetBindingHandle(); \
                           RpcTryExcept {
#define IFACE_RPC_END      } RpcExcept(1) { \
                               ThrowRpcException(::RpcExceptionCode()); \
                           } \
                           RpcEndExcept;

#pragma warning(disable:4275)

class SyIFaceBase
{
    private:
        SyRpcClient mRpcClient;
        RpcServerID mServerID;

protected:
        CMPDLL_EXPORT static void ThrowRpcException(unsigned long exception);

public:
        CMPDLL_EXPORT SyIFaceBase(RPC_IF_HANDLE ifSpec, RpcServerID serverID,
            const SyString& sServerName, UUID* objUuid = NULL, LPCTSTR sProtSeq = kProtSeq_NamedPipes);
        //
        // Input
        //     ifSpec - interface handle (client version)
        //     serverID - Server ID
        //     sServerName - Server name to connect to
        //     objUuid - Optional UUID for the server
        //     sProtSeq - Supported protocol sequence for the server
        // Error
        //     RPC errors can occur when connecting to the interface.  Callers should call
        //     IsValid after constructing an object.
        // Description
        //     Constructs the SyIFaceBase object and connects to the interface.  The interface
        //     will be disconnected when this object is destroyed.

CMPDLL_EXPORT virtual ~SyIFaceBase();

BOOL IsValid() const
            { return mRpcClient.GetBindingHandle() != NULL; }
        //
        // Input
        //     None
        // Return
        //     non-zero if this object is connected to an interface.
        // Description
        //     Use this function to determine if the constructor successfully connected to the
        //     passed interface.

RPC_BINDING_HANDLE GetBindingHandle() const
            { return mRpcClient.GetBindingHandle(); }
        RpcServerID GetAttachedServerID() const
            { return mServerID; }
        CMPDLL_EXPORT SyString GetServerName() const;
        //
```

A-7

```
        // Input
        //    None
        // Return
        //    String containing the server name
        // Error
        //    If there is an error, the function returns an empty string.
        // Description
        //    Gets the server name of the attached interface.
};

class SyIFaceMirror : public SyIFaceBase, public SyIfServerBase
{
    private:
        SyRpcClient mMirrorClient;

// Disable default constructor
        SyIFaceMirror();

public:
        CMPDLL_EXPORT SyIFaceMirror(RPC_IF_HANDLE ifMSpec, RPC_IF_HANDLE ifSpec,
          RpcServerID serverID, const SyString& sServerName);
        //
        // Input
        //    ifMSpec - interface handle of mirror interface (server version)
        //    ifSpec - interface handle (client version)
        //    serverID - Server ID
        //    sServerName - Server name to connect to
        //; Error
        //    RPC errors can occur.  Check IsValid() after construction.
        // Description
        //    Connects to the mirroring interface.  AddResponseIF should be called after
        //    construction to connect to the response interface.

CMPDLL_EXPORT virtual ~SyIFaceMirror();

CMPDLL_EXPORT RPC_STATUS AddResponseIF(LPCTSTR pszServerName = NULL);
        //
        // Input
        //    pszServerName - Server name to connect to
        // Return
        //    RPC_S_OK if successful, other RPC_S_... error code otherwise
        // Error
        //    RPC errors can occur -- be sure to check the return code.
        // Description
        //    Connects the response interface.

CMPDLL_EXPORT RPC_STATUS RemoveResponseIF();
        //
        // Input
        //    None
        // Return
        //    RPC_S_OK or RPC error
        // Description
        //    Removes and disconnects the response interface.
};

#endif
```

```
// NAME ifbase.cpp
//
// DESCRIPTION
//    Definition for SyIFaceBase and SyIFaceMirror.  All client RPC interface wrappers should derive
//    from one of these two classes.
//
//    If the interface is not mirrored, derive from SyIFaceBase.  If the interface is mirrored,
//    derive from SyIFaceMirror.
//
// COPYRIGHT
//    Copyright 1995 by Advanced Digital Systems Group. All rights reserved.
//
// VERSION CONTROL
//    $Header:   G:/PVCS/ARCHIVES/cmp/ifbase.cpv   1.21   Feb 28 1997 16:43:28   jclaar  $
#include "precomp.h"

#include <ifbase.hpp>
#include <regiface.hpp>
#include <ifacekey.h>
#include <imirror.h>
#include <crtdbg.h>
include <dbgdump.h> void SyIFaceBase::ThrowRpcException(unsigned long exception)
{
    throw SyRpcException(exception);
}

SyIFaceBase::SyIFaceBase(RPC_IF_HANDLE ifSpec, RpcServerID serverID,
  const SyString& sServerName, UUID* objUuid, LPCTSTR sProtSeq)
{
    mServerID = serverID;
    mRpcClient.ConnectToInterface(ifSpec, sServerName, objUuid, sProtSeq);
}

SyIFaceBase::~SyIFaceBase()
{
}

SyString SyIFaceBase::GetServerName() const
{
    SyString retString;
    if (!this->IsValid())
        return retString;
    _TUCHAR* sStringBinding;
    if (::RpcBindingToStringBinding(mRpcClient, &sStringBinding) == RPC_S_OK)
    {
        _TUCHAR* sServerName;
        if (::RpcStringBindingParse(sStringBinding, NULL, NULL, &sServerName, NULL, NULL) == RPC_S_OK)
        {
            retString = sServerName;
            ::RpcStringFree(&sServerName);
        }
        ::RpcStringFree(&sStringBinding);
    }
    return retString;
}

SyIFaceMirror::SyIFaceMirror(RPC_IF_HANDLE ifMSpec,
  RPC_IF_HANDLE ifSpec, RpcServerID serverID, const SyString& sServerName)
  : SyIFaceBase(ifSpec, serverID, sServerName),
    SyIfServerBase(ifMSpec)
{
    // Connect to the mirroring interface
    mMirrorClient.ConnectToInterface(BH_CLIENT_MIRROR, sServerName, NULL);
    _ASSERT(mMirrorClient.GetBindingHandle() != NULL);

// Provide the response interface
    SyString sCurName = ::GetCurrentName();
    this->AddResponseIF(sCurName.c_str());
}

SyIFaceMirror::~SyIFaceMirror()
{
    this->RemoveResponseIF();
}

RPC_STATUS SyIFaceMirror::AddResponseIF(LPCTSTR pszServerName)
{
```

```
    _ASSERT(mMirrorClient.GetBindingHandle() != NULL);
    RPC_STATUS status = RPC_S_OK;

int nSize = 0;
    // Get a Unicode version of the string
    LPWSTR sServerName = NULL;

if (pszServerName != NULL)
    {
        nSize = lstrlen(pszServerName)+1;
        sServerName = new wchar_t[nSize];
        ifndef _UNICODE
            ::MultiByteToWideChar(CP_ACP, MB_PRECOMPOSED, pszServerName, -1,
                sServerName, nSize);
        else
            lstrcpy(sServerName, pszServerName);
        endif
    }

RpcTryExcept (
        ::AddResponseIF(mMirrorClient, this->GetAttachedServerID(), this->GetServerID(),
        (sServerName) ? sServerName : L"");
    )
    RpcExcept(1)
    {
        status = ::RpcExceptionCode();
        SYTRACE(_T("AddResponseIF exception %d\n"), status);
    }
    RpcEndExcept;

if (sServerName != NULL)
        delete [] sServerName;

return status;
}

RPC_STATUS SyIFaceMirror::RemoveResponseIF()
{
    _ASSERT(mMirrorClient.GetBindingHandle() != NULL);
    RPC_STATUS status = RPC_S_OK;
    RpcTryExcept (
        ::RemoveResponseIF(mMirrorClient, this->GetAttachedServerID(), SyIfServerBase::GetServerID());
    )
    RpcExcept(1)
    {
        status = ::RpcExceptionCode();
        SYTRACE(_T("RemoveResponseIF exception %d\n"), status);
    }
    RpcEndExcept;
    return status;
}
```

What is claimed is:

1. A method for connecting objects over a network of nodes comprising:
    exposing an interface on a server object for a server node; and
    instantiating a client object for a client node, said instantiating automatically connecting said client object to said interface on said server object, said client object being operable for initiating a request for a service provided by said server object, said client and server objects derived from different base object classes having different functions; and
    exposing a mirrored client interface on the client object, wherein said client object acts as a server for an object connected to said mirrored client interface.

2. The method according to claim 1 further comprising: deriving said server object from a base server class; and assigning a unique server ID to said server object.

3. The method according to claim 1 further comprising: deriving said client object from a base client class.

4. The method according to claim 2 further comprising: deriving a new server object from said base server class; exposing an interface on said new server object; and assigning a unique server ID to said new server object.

5. The method according to claim 1 further comprising: exposing an mirrored server interface on said server object, wherein said server object acts as a client of an object connected to said mirrored server interface; and
    connecting said client object to said mirrored server interface on said server object.

6. The method according to claim 1 further comprising: instantiating a new client object for each one of a plurality of clients that is to use said service provided by said server object.

7. The method according to claim 1, wherein said server object is one of a plurality of server objects providing services and further comprising:
    instantiating a new client object for each one of a plurality of clients that is to use said services provided by said plurality of server objects.

8. A system for, connecting two objects over a network of nodes comprising:
    a server object interface exposed on a first server object on a server node and configured to pass a unique server ID; and
    a client object interface exposed on said first server object and configured to connect a plurality of client objects on at least one client node with said first server object, each of said plurality of client objects being operable for initiating a request for a service provided by said first server object, said first server and client objects derived from different base object classes having different functions.

9. The system according to claim 8 further comprising:
    a mirrored client object interface exposed on a second server object and configured to pass a unique server ID, wherein said second server object acts as a client of said first server object when said first server object is connected to the mirrored client object interface; and
    a mirrored server object interface exposed on said first server object and configured to connect a single client object with said first server object, said first server object being operable for initiating a request for a service provided by said single client object.

10. The system according to claim 9 wherein said interfaces are instantiated from a class library.

11. The system according to claim 8 further comprising a network interface for exposing said interfaces and for communicating said unique server ID within said network.

12. A data processing system for connecting objects over a network of nodes comprising:
    a central processing unit (CPU) configured to execute instructions and process data; and
    a memory coupled to said CPU, said memory placing instructions to cause said CPU to execute a method comprising:
    exposing an interface on a server object on a server node;
    instantiating a client object on a client node, said instantiating automatically connecting said client object to said interface on said server object, said client object being operable for initiating a request for a service provided by said server object, said server and client objects derived from different base object classes having different functions; and
    exposing a mirrored client interface on the client object, wherein said client object acts as a server for an object connected to said mirrored client interface.

13. The data processing system according to claim 12 further comprising a storage unit configured to store said instructions and make them available to said memory.

14. The data processing system according to claim 12 wherein causing the memory to place instructions to said CPU causes said CPU to further execute said method comprising:
    exposing a mirrored server interface on said server object, wherein said server objects acts as a client of an object connected to said mirrored server interface; and
    connecting said client object to said mirrored server interface on said server object.

15. The data processing system according to claim 12 further comprising a network interface, said network interface permitting said server object interface to be exposed onto said network, said network further exposing client objects and their interfaces from an additional data processing system.

16. The data processing system according to claim 12 further comprising a control panel operable for modifying a data processing parameter.

* * * * *